(12) United States Patent
Trushanin et al.

(10) Patent No.: US 10,541,462 B2
(45) Date of Patent: Jan. 21, 2020

(54) METHOD FOR ELIMINATION OF ANTENNA ANGULAR ORIENTATION ERROR IN POINT-TO-POINT COMMUNICATION SYSTEM

(71) Applicant: LIMITED LIABILITY COMPANY "RADIO GIGABIT", Nizhny Novgorod (RU)

(72) Inventors: Aleksey Ur'evich Trushanin, Nizhniy Novgorod (RU); Roman Olegovich Maslennikov, Nizhniy Novgorod (RU); Aleksey Andreevich Artemenko, Nizhniy Novgorod (RU); Rashid Ravilevich Kalimulin, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 0 days.

(21) Appl. No.: 16/229,418

(22) Filed: Dec. 21, 2018

(65) Prior Publication Data

US 2019/0198969 A1    Jun. 27, 2019

(30) Foreign Application Priority Data

Dec. 26, 2017   (RU) ............................... 2017145995

(51) Int. Cl.
*H01Q 3/00* (2006.01)
*H01Q 1/12* (2006.01)
(Continued)

(52) U.S. Cl.
CPC ........... *H01Q 1/1257* (2013.01); *H01Q 3/245* (2013.01); *H01Q 25/007* (2013.01); *H04B 7/155* (2013.01); *H04B 17/00* (2013.01)

(58) Field of Classification Search
CPC ........... H01Q 3/245; H01Q 3/08; H01Q 3/12; H01Q 3/32; H01Q 3/34; H01Q 3/22;
(Continued)

(56) References Cited

U.S. PATENT DOCUMENTS

| 4,696,053 A * | 9/1987 | Mastriani | H04B 7/005 342/359 |
| 6,836,675 B2 * | 12/2004 | Zhang | H04W 24/02 342/357.395 |

(Continued)

FOREIGN PATENT DOCUMENTS

| CN | 107332592 A | 11/2017 |
| WO | 2015048998 A1 | 4/2015 |

OTHER PUBLICATIONS

Decision to Grant with regard to the counterpart RU Patent Application No. 2017145995 dated Aug. 1, 2018 and its translation into English.

(Continued)

*Primary Examiner* — Chuong P Nguyen
(74) *Attorney, Agent, or Firm* — BCF LLP

(57) ABSTRACT

The present invention is related to means for elimination of antenna orientation errors in millimeter wave point-to-point communication systems with beam steerable antennas. The advantage of the proposed method consists in accelerating antenna angular orientation adjustment for two connected transceivers. The advantage is achieved via determination of a value and a direction of an antenna orientation error and its further fast mechanical elimination. The method assumes transmission of radio signals and reception of them with measurement of the received signal powers. Determination of a direction and a value of an orientation error of the first transceiver antenna is achieved via measurement of the powers of signals transmitted by this antenna using different radiation patterns. Determination of a direction and a value (Continued)

100 of an orientation error of the second transceiver antenna is achieved via measurement of the powers of signals received by this antenna using different radiation patterns.

12 Claims, 2 Drawing Sheets

(51) Int. Cl.
*H01Q 3/24* (2006.01)
*H01Q 25/00* (2006.01)
*H04B 7/155* (2006.01)
*H04B 17/00* (2015.01)

(58) Field of Classification Search
CPC ........ H01Q 3/24; H01Q 1/125; H01Q 1/1257; H01Q 25/007; H04B 7/155
USPC .................................................. 342/359, 372
See application file for complete search history.

(56) References Cited

U.S. PATENT DOCUMENTS

| | | | | |
|---|---|---|---|---|
| 7,065,326 B2* | 6/2006 | Lovberg | ................ | H01Q 1/125 332/141 |
| 7,501,982 B2* | 3/2009 | Charash | ............... | H01Q 1/1257 342/359 |
| 7,501,993 B2* | 3/2009 | Boucher | ................. | G01S 19/43 343/757 |
| 8,193,983 B1* | 6/2012 | Farmer | ................... | H01Q 3/06 342/367 |
| 8,487,813 B2* | 7/2013 | Leiba | .................. | H01Q 1/1257 342/359 |
| 8,849,288 B2* | 9/2014 | Vilhar | .................... | G01R 29/10 455/446 |
| 9,281,559 B2* | 3/2016 | Ransom | ................. | H01Q 3/005 |
| 9,391,688 B2* | 7/2016 | Artemenko | .......... | H01Q 1/1257 |
| 9,781,233 B2* | 10/2017 | Wattwood | ........... | H01Q 1/1257 |
| 10,096,886 B2* | 10/2018 | Xu | ....................... | H01Q 1/1257 |
| 2009/0243930 A1* | 10/2009 | Tien | .................... | H01Q 1/1257 342/360 |
| 2016/0056525 A1* | 2/2016 | Hansryd | .............. | H01Q 1/1257 |
| 2017/0141463 A1* | 5/2017 | Wattwood | .............. | G01S 19/35 |
| 2018/0062246 A1* | 3/2018 | Hershey | .............. | H01Q 1/1242 |

OTHER PUBLICATIONS

English Abstract for CN107332592 retrieved on Espacenet on Dec. 21, 2018.

* cited by examiner

METHOD FOR ELIMINATION OF ANTENNA ANGULAR ORIENTATION ERROR IN POINT-TO-POINT COMMUNICATION SYSTEM

FIELD OF THE INVENTION

The present application claims priority to Russian Patent Application No. 2017145995, filed Dec. 26, 2017, the entirety of which is incorporated herein by reference.

The present invention is generally related to the field of radio communications in the millimeter wave band and more specifically to means for mechanical elimination of antenna angular orientation errors in point-to-point communication systems operating in the millimeter wave band and having a narrow main lobe of a radiation pattern.

BACKGROUND OF THE INVENTION

Radio-relay stations (RRS) of the millimeter wave band are widely used in communication networks to provide a wireless connection of the point-to-point topology between two remote network nodes. Typical application fields for RRS of the millimeter wave band are connections of relatively short ranges but requiring high data rates approaching several gigabits per second and tens of gigabits per second. High data rates are provided by using high bandwidths of a transmitted signal ranged from hundreds of megahertz to several gigahertz.

Efficient signal transmission in RRS requires a sufficient level of the received signal power. This requirement can be transformed to a necessity for a sufficient effective antenna aperture exceeding at least 100 cm² irrespectively of a wavelength. For millimeter wave systems such effective aperture includes a lot of wavelength squares which translates to a high antenna gain and a sufficiently small effective width of the main radiation pattern lobe. The said feature is reflected also in a known Friis equation:

$$G=G_1 G_2 (\lambda/4\pi d)^2,$$

where G is a total power gain of a channel, $G_1$ and $G_2$ are gains of transmitting and receiving antennas, $\lambda$ is a signal wavelength, d is a distance between a transmitter and a receiver. As follows from the equation, if the wavelength is decreased the antenna gains are to be increased in order to keep the total channel gain unchanged.

A typical width of the main radiation pattern lobe for RRS of the millimeter wave band used in practice does not exceed 1-3° measured at the level of −3 dB relative to the maximum. For less apertures and greater widths of the main radiation pattern lobe, the total channel power gain turns out to be so low that RRS lose their practical applicability. A width of the main radiation pattern lobe sets an upper limit to an acceptable value of antenna orientation errors in each of the two planes: azimuth and elevation. In particular, assuming the maximal acceptable loss in the total channel power gain of 3 dB and considering presence of angular orientation errors at the two link ends and in the two planes, each orientation error can cause an antenna gain loss in the line-of-sight direction of no more than 0.75 dB. For a typical width of the main lobe at the level of −3 dB of 2° this requirement limits the range of acceptable angular errors by the value of ±0.5°.

The prior art includes methods for increasing the effective angular coverage of an antenna while keeping the same gain due to a possibility of varying the radiation pattern. This possibility reduces requirements to the angular antenna orientation accuracy. An example of such method is disclosed in U.S. Pat. No. 9,391,688, published Aug. 14, 2014, "System and method of relay communication with electronic beam adjustment", a prototype. The patent proposes a method for changing a radiation pattern of a narrow beam antenna during system operation to provide permanent alignment of the line-of-sight direction and the direction of a modified radiation pattern maximum. However, in the proposed method the scanning range, i.e. a range of variability of a direction of the radiation pattern maximum, turns out to be limited. It is known from the antenna theory that a ratio of the angular scanning range to the width of the main radiation pattern lobe at the level of −3 dB cannot exceed the number of independently controlled radiating elements in a corresponding projection (vertical for the elevation angle and horizontal for the azimuth angle). On the other hand, in RRS of the millimeter wave band the total number of independently controlled elements is equal to the number of independent radio frequency channels supplying the antenna and, in the majority of cases, to the number of radio frequency modules within a system. The number of such channels and modules is practically limited by an order of 10 because of implementation issues. Considering, for example, 9 channels, the number of elements in each projection is equal to 3 and therefore the maximal scanning range is only three times more than the width of the main radiation pattern lobe at the level of −3 dB. For the example discussed above, usage of the mentioned system changes the required initial antenna orientation accuracy from ±0.5° only to ±2.5° ideally.

Simplest methods for mechanical setting the antenna orientation not requiring special devices can provide errors of setting the angle of about ±3° and more. For RRS of the millimeter wave band this accuracy often becomes insufficient for antennas with both a fixed radiation pattern and a steerable direction of the maximum. Therefore, the problem of accurate mechanical adjustment of the antenna orientation using special technical means (during mounting or during RRS operation if it is required) for RRS of the millimeter wave band is still actual.

The prior art includes different methods for such adjustment which can be conventionally divided into methods assuming usage of additional devices and methods utilizing the RRS transceivers themselves for selection of an orientation angle. Besides, methods for antenna orientation adjustment utilizing the transceivers have a significant advantage. U.S. Pat. No. 7,501,982, published, "Antenna alignment method", a prototype, discloses a method for antenna orientation selection utilizing RRS transceivers. The proposed invention assumes a support of a special operation mode for antenna orientation adjustment by an RRS. In the adjustment mode receiver sensitivity is increased via one of numerous methods, e.g. via transmission of special long sequences of a known signal and applying the respective digital signal processing methods at the receiver. It is assumed that the adjustment mode provides a capability to perform channel power gain measurements (link power budget measurements) even if the line-of-sight direction is aligned with a direction of side lobes of the radiation pattern. Performing mechanical antenna orientation adjustment for maximizing the measured power gain is assumed.

The described method enables informing a rotary device or staff performing antenna orientation adjustment about a value of the required angular rotation only within the angular range of the main radiation pattern lobe. For greater deviations of the antenna orientation angle leading to alignment of the line-of-sight direction with directions of side lobes, a relation between the channel gain and the orientation angle becomes ambiguous and therefore a value of the current rotation angle cannot be determined. The described method also does not provide a possibility to determine a direction of the required angular correction because the majority of antennas have symmetrical radiation patterns. Besides, for antennas having low levels of side lobes or for long haul lengths gain measurements out of the main radiation pattern lobe can be impossible due to inability of signal detection and performing synchronization over the thermal noise. Therefore, application of the invention assumes performing a blind search of the RRS antenna optimal orientation.

Accelerating a process of selection of the angular orientation of an RRS antenna requires a method of mechanical antenna orientation adjustment not requiring application of additional equipment and providing a capability for indication of a current value and a direction (a sign) of the angular orientation error at each time instant avoiding a blind search of the optimal antenna orientation.

SUMMARY OF THE INVENTION

An object of the disclosed subject matter proposes a method for elimination of an angular orientation error of an antenna for RRS of the millimeter wave band in a wireless network of the point-to-point topology assuming measurement of a value and a direction (a sign) of the current antenna angular orientation error at two ends of the link and further mechanical correction of the antenna orientation. The proposed method utilizes RRS transceivers for determining the current antenna orientation angles. The proposed method is applicable to RRS with steerable antennas for which a set of at least two different radiation patterns can be configured.

Advantages of the proposed method include accelerating the process of selection of the antenna angular orientation for one of the transceivers or for two transceivers within a point-to-point communication system in the initial mounting process or during the system operation. The advantage is achieved via direct determination of a value and a direction of the current antenna angular orientation error in a wide angular range at each instant and its further elimination by means of mechanical rotation of the antenna in one or two planes (azimuth or elevation).

The claimed method of elimination of an antenna angular orientation error in a point-to-point communication system which consists of two transceivers with a connection established between them for elimination of an angular orientation error of an antenna of the first transceiver comprises:
  transmitting modulated radio signals by the first transceiver with successive selection of an antenna radiation pattern used for transmission from a set of patterns comprising at least two patterns with different angular orientations of the pattern maximums;
  receiving and measuring powers by the second transceiver for the signals transmitted by the first transceiver using at least two antenna radiation patterns from the said set;
  determining a value and a direction of an antenna angular orientation error of the first transceiver in at least one plane due to processing by the second transceiver of the measured powers of the signals transmitted by the first transceiver using at least two antenna radiation patterns from the set; and
  mechanically rotating an antenna of the first transceiver in at least one plane against the determined direction and by the determined angle to eliminate the orientation error.

The claimed method for elimination of an angular orientation error of an antenna of the second transceiver comprises:
  transmitting modulated radio signals by the first transceiver;
  receiving and measuring signal powers by the second transceiver with successive selection of an antenna radiation pattern used for reception from a set of patterns comprising at least two patterns with different angular orientations of the pattern maximums;
  determining a value and a direction of an antenna angular orientation error of the second transceiver in at least one plane due to processing by the second transceiver of the measured powers of the signals received by the second transceiver using at least two antenna radiation patterns from the said set; and
  mechanically rotating an antenna of the second transceiver in at least one plane against the determined direction and by the determined angle to eliminate the orientation error.

In one embodiment, processing of the measured powers by the second transceiver consists in selection of a radiation pattern from the set of patterns with different angular orientations of the maximums corresponding to the maximal received power.

In another embodiment, processing of the measured powers by the second transceiver consists in selection of a vector of powers from a set of known vectors of powers closest to the vector of measured powers in a vector space of powers.

In a further embodiment, at least two signals modulated by different sequences of symbols are used for transmission with radiation patterns having different angular orientations of the maximum.

In one of more specific embodiments, sequences with low cross-correlation are used.

In one embodiment, a signal modulated by a single sequence of symbols is used for transmission with radiation patterns having different angular orientations of the maximum, a succession of selection of radiation patterns of the first transceiver during transmission of signals by the first transceiver is a priori known to both the transceivers, and both the transceivers are synchronized in time.

In another embodiment, the signals are modulated by Golay sequences.

In a further embodiment, transmission of the signals is performed in time intervals allocated in a frame in which transmission of signals carrying payload data and other control signals is not performed.

In an embodiment, transmission of the signals is performed in a transceiver operation mode specially intended for elimination of an antenna angular orientation error in which transmission of payload data and other control signals is not performed.

In one embodiment, beam steerable dielectric lens antennas are used for forming radiation patterns with different angular orientations of the maximum.

In another embodiment, phased antenna arrays are used for forming radiation patterns with different angular orientations of the maximum.

In a further embodiment, values of antenna angular orientation errors determined in the method are used for deciding on presence or absence of necessity for mechanical rotation of an antenna.

BRIEF DESCRIPTION OF THE DRAWINGS

Further features and advantages of the present invention will become apparent from the following description of preferred embodiments with reference to accompanying drawings.

In the figures, the numbers indicate the following positions:

101—a first transceiver; 102—a second transceiver 103—an antenna of the first transceiver; 104—an antenna of the second transceiver; 105 an angular orientation error of the first transceiver antenna; 106—an angular orientation error of the second transceiver antenna; 201—a first radiation pattern, 202—a second radiation pattern, 203—a direction to the opposite transceiver corresponds to the optimal antenna orientation, 204—an example of a current direction to the opposite transceiver, 205—the left edge of the angular range where determination of a turn direction of rotation is possible from knowledge of a diagram with the maximal measured power, 206—the right edge of the angular range where determination of a direction of rotation is possible from knowledge of a diagram with the maximal measured power, 207—another example of a current direction to the opposite transceiver.

DETAILED DESCRIPTION OF THE INVENTION

A description of an embodiment of the claimed method for elimination of an antenna angular orientation error in a point-to-point communication system assuming measurement of values and directions of current antenna angular orientation errors at the two ends of a link as well as the mechanical rotation of the transceiver antennas is provided below.

Figure 1:
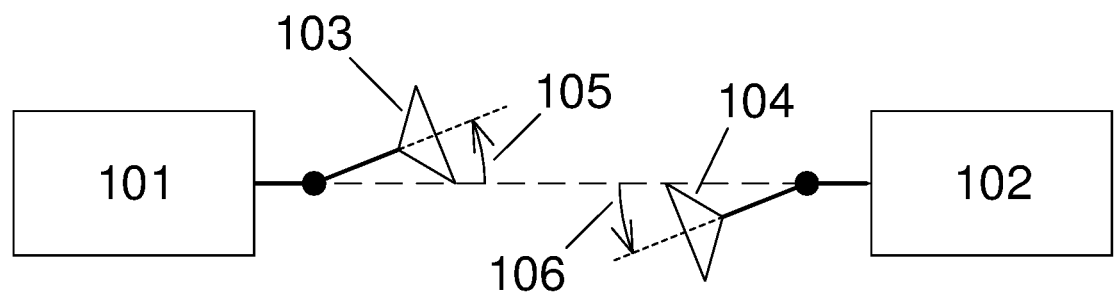
FIG. 1—a diagram of a point-to-point communication system 100 comprising two transceivers with a connection established between them.

As illustrated in FIG. 1, a network 100, consists of two transceivers located at the two ends of a communication link which are further called the first transceiver (101) and the second transceivers (102). An antenna of the first transceiver (103) has an angular orientation error (105) and an antenna of the second transceiver (104) has an angular orientation error (106). It is assumed that measurement of angular orientation errors (105) and (106) is performed by the second transceiver (102) and determined orientation errors (105) and (106) are originally available at the second transceiver side. The claimed method consists in is directed to performing a sequence of actions comprising transmission of modulated radio signals by the first transceiver (101), reception and measurement of powers of the received signals by the second transceiver (102), processing of the measured powers by the second transceiver (102) for determination and indication of current antenna angular orientation errors (105) and (106), and mechanical rotation of the antennas (103) and (104).

Details of implementation of individual stages vary depending on whether the first transceiver antenna (103) or the second transceiver antenna (104) is being tuned.

For elimination of an angular orientation error (105) of the antenna of the first transceiver (103) the method for elimination of antenna angular orientation errors in a point-to-point communication system which consists of two transceivers with a connection established between them is performed as follows.

Transmission of modulated radio signals by the first transceiver (101) with successive selection of an antenna radiation pattern used for transmission from a set of patterns comprising at least two patterns with different angular orientations of the pattern maximum is performed for elimination of an angular orientation error (105) of the antenna of the first transceiver (103).

Then reception and measurement of signal powers by the second transceiver (102) for the signals transmitted by the first transceiver (101) using at least two antenna radiation patterns from the set is performed for elimination of an angular orientation error (105) of the first transceiver antenna (103).

After this stage determination of a value and a direction of an antenna angular orientation error of the first transceiver (105) in at least one plane (vertical and/or horizontal) is performed at the stage of determination and indication of antenna angular orientation errors due to processing by the second transceiver (102) of the measured powers of the signals transmitted by the first transceiver (101) using at least two antenna radiation patterns from the said set. It is assumed that for determination of a value and a direction of an antenna angular orientation error (105) in a particular plane at least some of the radiation patterns within the set have different orientations of the maximum in the corresponding plane.

Then mechanical rotation of the first transceiver antenna (103) in at least one plane (vertical and/or horizontal) against the determined direction and by the determined angle to eliminate the orientation error (105) of the first transceiver antenna (103) is performed at the stage of mechanical rotation of an antenna (104) by RRS service staff or respective devices in the automatic mode.

For elimination of an angular orientation error (106) of the antenna of the second transceiver (104) the method for elimination of antenna angular orientation errors in a point-to-point communication system which consists of two transceivers with a connection established between them is performed as follows.

According to FIG. 1, transmission of modulated radio signals by the first transceiver (101) is performed for elimination of an angular orientation error (106) of the second transceiver antenna (104).

Then reception and measurement of signal powers by the second transceiver (102) with successive selection of an antenna radiation pattern used for reception from a set of patterns comprising at least two patterns with different angular orientations of the pattern maximums is performed for elimination of an angular orientation error (106) of the second transceiver antenna (104).

After this stage determination of a value and a direction of an antenna angular orientation error of the second transceiver (106) in at least one plane (vertical and/or horizontal) is performed at the stage of determination and indication of antenna angular orientation errors (103) due to processing by the second transceiver (102) of the measured powers of the signals received by the second transceiver (102) using at least two antenna radiation patterns from the said set. It is assumed that for determination of a value and a direction of an antenna angular orientation error (106) in a particular plane at least some of the radiation patterns within the set have different orientations of the maximum in the corresponding plane.

Then mechanical rotation of the second transceiver antenna (104) in at least one plane (vertical and/or horizontal) against the determined direction and by the determined angle to eliminate the orientation error (106) of the second transceiver antenna (104) is performed at the stage of mechanical rotation of an antenna (104) by RRS service staff or respective devices in the automatic mode.

Figure 2:
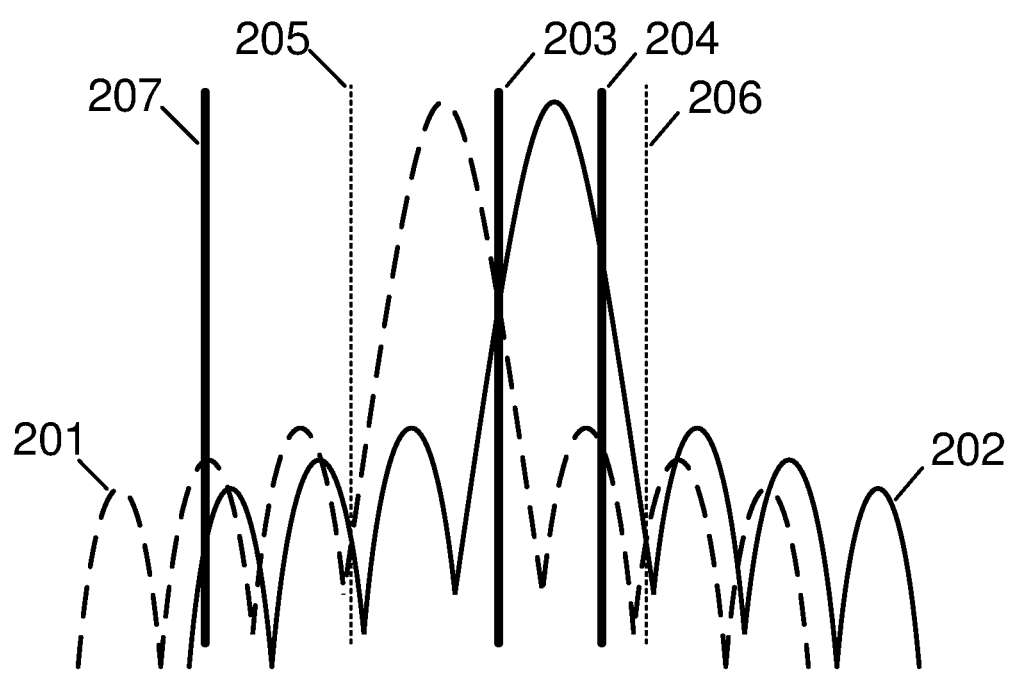
FIG. 2—examples of radiation patterns for an antenna for which elimination of an angular orientation error is performed.

In an embodiment of the method, processing of the measured powers by the second transceiver (102) consists in selection of a radiation pattern from the set of patterns with different angular orientations of the maximums corresponding to the maximal received power. FIG. 2 provides examples of the first radiation pattern (201) and the second radiation pattern (202) of an antenna for which the orientation adjustment is performed. The provided diagrams constitute a set of diagrams for transmission of modulated radio signals by the first transceiver (101) or reception and measurement of signal powers by the second transceiver (102). In the example, determination of an orientation in a single plane is considered. Determination of an orientation in another plane, if present, is similar. A direction to the opposite transceiver corresponding to the optimal antenna orientation (203) is provided in FIG. 2. Examples (204) and (207) are examples of directions to the opposite transceiver corresponding to the current antenna orientation. In the proposed method, if the maximal power is measured at the first radiation pattern (201), necessity to rotate the antenna to the left is determined and if the maximal power is measured at the second radiation pattern (202), necessity to rotate the antenna to the right is determined. In the angular range from the left edge (205) to the right edge (206) correct determination of a direction of rotation leading to the optimal antenna orientation is possible from knowledge of a diagram with the maximal measured power. In the general case, the required directions and angles of rotation of an antenna are unambiguously determined through an index of a selected radiation pattern.

In another embodiment, processing of the measured powers by the second transceiver (102) consists in selection of an element from a set of known vectors of powers closest to the vector of measured powers in a vector space of powers. The set of vectors of powers is built preliminarily via trying different orientation angles, e.g., by enumerating the angles with a fixed small step, and remembering a vector of measured power for each orientation error. For each tried angle, a set of values for all radiation patterns constitutes a vector corresponding to a vector of measured powers at the considered antenna orientation angle (up to a common normalization factor). If a vector of powers measured at the stage of reception and measurement of signal powers by the second transceiver (102) coincides with or is close enough to an element from the set of vectors, a decision on equality of the current antenna orientation angle and the angle used for forming the element of the set is done in a manner of fingerprinting. In the general case, the required directions and angles of rotation of an antenna are unambiguously determined through an index of a selected element in the set.

In an embodiment of the method, at least two signals modulated by different sequences of symbols are used for transmission with radiation patterns having different angular orientations of the maximum. In particular, sequences with low cross-correlation can be chosen. Low cross-correlation of the sequences provides a possibility of unambiguous identification of each of them at the second transceiver (102). Identification of the signals allows to associate the measured powers with the radiation patterns of the first transceiver (101) used for transmission of the corresponding signals.

In another embodiment, a signal modulated by a single sequence of symbols or by different sequences having high cross-correlation is used for transmission with radiation patterns having different angular orientations of the maximum. A succession of selection of the radiation patterns of the first transceiver (101) during transmission of signals by the first transceiver is a priori known to both the first transceiver (101) and the second transceivers (102), and both the transceivers (101) and (102) are synchronized in time. This approach also allows to unambiguously associate the measured signal powers with the radiation patterns of the first transceiver (101) used for transmission of the corresponding signals.

In one embodiment of the method, the transmitted radio signals are modulated by Golay sequences. The structure of Golay sequences allows implementing an efficient Golay correlator at the second transceiver (102) for fast and computationally simple measurement of the received signal powers which is especially important for RRS of the millimeter band because of a large signal bandwidth.

In an embodiment of the method, transmission of the signals is performed in time intervals allocated in the frame structure in which transmission of signals carrying payload data and other control signals is not performed. These intervals can be allocated in the beginning of each frame. In each interval transmission of one of the test signals is performed. Radiation patterns used for transmission of the test signals in the allocated time intervals can alternate each other from frame to frame such as all radiation patterns from the specified set are used once each in several consecutive frames. The used signals can alternate each other according to the alternation rule of the radiation patterns. Out of the allocated intervals a radiation pattern selected optimally is used for transmission and reception of the payload signals and other control signals.

In another embodiment, transmission of the signals is performed in a transceiver operation mode specially intended for elimination of antenna angular orientation errors in which transmission of payload data and other control signals is not performed. In this approach transmission of the test signals can occupy all the system time resources. The used radiation patterns and the corresponding signals can alternate each other in time.

In an embodiment of the method, beam steerable dielectric lens antennas are used for forming radiation patterns with different angular orientations of the maximum. Such antennas have multiple radiating elements placed in a focal plane of a lens. Forming different radiation patterns in such antennas is performed by means of enabling a single radiating element from a set of available elements.

In another embodiment, phased antenna arrays are used for forming radiation patterns with different angular orientations of the maximum. In this case, a set of amplitudes and phases for different array elements can be one-to-one associated with a radiation pattern. All used sets of amplitudes and phases in this case constitute a code book of the array including a finite set of elements.

In one embodiment of the method, a possibility of changing a radiation pattern assumed in the invention can be also applied to dynamic adjustment of a radiation pattern during the system operation after the initial mechanical orientation. A possibility of dynamic adjustment can be used, for example, for compensation of insignificant variations of the orientation angle during the system operation. Values of angular orientation errors determined in the proposed method can be used during the system operation for deciding on necessity for a next mechanical correction of the antenna orientation. Such decision can be done if measured errors exceed the angular range of variations of a direction of the radiation pattern maximum at least in one plane.

The proposed method for RRS antenna orientation adjustment sufficiently increases a range of detectable and measurable orientation errors compared to a range of variation of the radiation pattern maximum of the same antenna due to usage of measured values of the gains in directions of side lobes of the radiation pattern. Increasing the angular range in which an antenna gain is high enough also lets to increase a range of detectable and measurable orientation errors for a low signal-to-noise ratio of the received signal, e.g. for long ranges of a link. Measurement of gains for multiple radiation patterns and using a set of the estimates provides a possibility to determine not only a fact of an incorrect orientation but also a particular direction and a value of an error.

Therefore, the proposed invention allows avoiding a blind search of an optimal antenna orientation during the initial transceiver mounting or in the case of an orientation disturbance during the system operation. Avoiding a blind search provides acceleration of the process of optimal antenna orientation selection.

The invention was disclosed above with a reference to its specific embodiments. Specialists may suggest other implementations of the invention that do not alter its essence as it is described above. Therefore, the invention should be limited only by the following claims.

The invention claimed is:

1. A method for elimination of an antenna angular orientation error in a point-to-point communication system which consists of a first transceiver and a second transceiver having an established connection between them, comprising:
   transmitting modulated radio signals by the first transceiver;
   receiving the signals of the first transceiver and measuring received signal powers by the second transceiver;
   wherein elimination of an angular orientation error of an antenna of the first transceiver is performed via:
      transmitting signals by the first transceiver with successive selection of an antenna radiation pattern used for transmission from a set of patterns comprising at least two patterns with different angular orientations of the pattern maximums;
      receiving and measuring powers by the second transceiver for the signals transmitted by the first transceiver using at least two antenna radiation patterns from the set;
      determining a value and a direction of the antenna angular orientation error of the first transceiver in at least one plane by the first or the second transceiver based on the powers of the signals transmitted by the first transceiver using at least two antenna radiation patterns from the set measured by the second transceiver; and
      mechanically rotating the antenna of the first transceiver in at least one plane against the determined direction and by the determined value to eliminate the orientation error; and
   wherein elimination of an angular orientation error of an antenna of the second transceiver is performed via:
      transmitting signals by the first transceiver;
      receiving and measuring signal powers by the second transceiver with successive selection of an antenna radiation pattern used for reception from a set of patterns comprising at least two patterns with different angular orientations of the pattern maximums;
      determining a value and a direction of the antenna angular orientation error of the second transceiver in at least one plane by the first or the second transceiver based on the powers of the signals received by the second transceiver using at least two antenna radiation patterns from the set measured by the second transceiver; and
      mechanically rotating the antenna of the second transceiver in at least one plane against the determined direction and by the determined value to eliminate the orientation error.

2. The method according to claim 1, wherein processing of the measured powers by the second transceiver includes selecting a radiation pattern from the set of patterns with different angular orientations of the maximums corresponding to a maximal received power.

3. The method according to claim 1, wherein processing of the measured powers by the second transceiver includes selecting a vector of powers from a set of known vectors of powers closest to the vector of measured powers in a vector space of powers.

4. The method according to claim 1, wherein at least two signals modulated by different sequences of symbols are used for transmission with radiation patterns having different angular orientations of the maximum.

5. The method according to claim 4, wherein sequences having low cross-correlations are used.

6. The method according to claim 1, wherein a signal modulated by a single sequence of symbols is used for transmission with radiation patterns having different angular orientations of the maximum, a succession of selection of the radiation patterns of the first transceiver during transmission of signals by the first transceiver is a priori known to both the first and second transceivers, and both the first and second transceivers are synchronized in time.

7. The method according to claim 1, wherein the signals are modulated by Golay sequences.

8. The method according to claim 1, wherein transmission of the signals is performed in time intervals allocated in a frame in which transmission of signals carrying payload data and other control signals is not performed.

9. The method according to claim 1, wherein transmission of the signals is performed in a transceiver operation mode specially intended for elimination of an antenna angular orientation error in which transmission of payload data and other control signals is not performed.

10. The method according to claim 1, wherein beam steerable dielectric lens antennas are used for forming radiation patterns with different angular orientations of the maximum.

11. The method according to claim 1, wherein phased antenna arrays are used for forming radiation patterns with different angular orientations of the maximum.

12. The method according to claim 1, wherein the determined values of antenna angular orientation errors are used to decide whether to mechanically rotate an antenna.

* * * * *